US010277669B1

(12) United States Patent
Joliveau et al.

(10) Patent No.: US 10,277,669 B1
(45) Date of Patent: Apr. 30, 2019

(54) COMMUNICATION CHANNEL BETWEEN DEVICE AND CDN DURING PLAYBACK

(71) Applicant: Amazon Technologies, Inc., Seattle, WA (US)

(72) Inventors: Marc Joliveau, Seattle, WA (US); Nicholas James Benson, Seattle, WA (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 15/174,800

(22) Filed: Jun. 6, 2016

(51) Int. Cl.
*G06F 15/173* (2006.01)
*H04L 29/08* (2006.01)
*H04L 12/911* (2013.01)
*H04L 12/02* (2006.01)

(52) U.S. Cl.
CPC .......... *H04L 67/10* (2013.01); *H04L 12/02* (2013.01); *H04L 47/70* (2013.01); *H04L 67/02* (2013.01); *H04L 67/06* (2013.01); *H04L 67/1097* (2013.01)

(58) Field of Classification Search
None
See application file for complete search history.

(56) References Cited

U.S. PATENT DOCUMENTS

| 9,607,656 | B1* | 3/2017 | Serce | G11B 27/11 |
|---|---|---|---|---|
| 2011/0299586 | A1* | 12/2011 | Odlund | H04L 65/00 375/240.01 |
| 2012/0278496 | A1* | 11/2012 | Hsu | H04N 21/4381 709/231 |
| 2013/0067108 | A1* | 3/2013 | Nooney | H04L 65/4084 709/231 |
| 2014/0221093 | A1* | 8/2014 | Quan | A63F 13/10 463/31 |
| 2014/0280781 | A1* | 9/2014 | Gregotski | H04L 65/60 709/219 |

* cited by examiner

*Primary Examiner* — Mohamed Ibrahim
(74) *Attorney, Agent, or Firm* — Weaver Austin Villeneuve & Sampson LLP

(57) ABSTRACT

Methods and apparatus are described for implementing a communication channel between a client device and a content distribution network (CDN) during playback of media content. The communication channel can be used by a client device to provide the CDN information pertaining to fragments the client device anticipates requesting from the CDN, as well as by the CDN to provide feedback to the client device regarding whether it is likely that the CDN will be able to satisfy the anticipated requests. The CDN can perform various operations based, at least in part, upon the information it receives from the client device.

28 Claims, 7 Drawing Sheets

COMMUNICATION CHANNEL BETWEEN DEVICE AND CDN DURING PLAYBACK

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content (e.g., movies, television shows, videos, music, and electronic books) is often streamed over networks using adaptive bitrate streaming for playback on a viewer's device. Adaptive bitrate streaming includes determining a user's device bandwidth and hardware resources (e.g., available central processing unit (CPU) capacity) in real time and adjusting the quality of the media content that is requested and played back on the user's device to account for changes in the bandwidth and hardware resources. Fragments at different quality levels, or bit rates, of the media content detailed in a manifest file are requested individually and stored in a buffer for playback.

Requests for media content are received by an edge server of a content distribution network (CDN). If the edge server determines that requested fragments are not in its cache, the edge server retrieves them from an origin server. Since the fragments are not available locally at the edge server, the user may perceive disruptions during playback of the media content.

DETAILED DESCRIPTION

This disclosure describes techniques for implementing communication channels between a content distribution network (CDN) and client devices that enables the CDN to more efficiently deliver media content to consumers. More specifically, these techniques enable client devices to communicate with edge servers of a content distribution network (CDN) during playback of media content regarding fragments that they anticipate requesting from the CDN. For example, one client device might ascertain that its bandwidth is increasing, and communicate to an edge server that it is likely to request fragment(s) of the media content that correspond to a higher bit rate. As another example, another client device may anticipate that its bandwidth will likely decrease in the immediate future, and communicate to an edge server that it is likely to request fragment(s) of the media content that correspond to a lower bit rate. The edge server may perform various operations based, at least in part, upon the information it receives from the various client devices regarding the fragments they anticipate requesting. For example, the edge server may check a cache of the CDN to determine its contents, communicate to client device(s) regarding the contents of the cache, modify the contents of the cache (e.g., by evicting fragments, retaining fragments, and/or pre-caching fragments), and/or update its caching policy that it uses to make future caching decisions. Various implementations will be described in further detail below.

Figure 1:
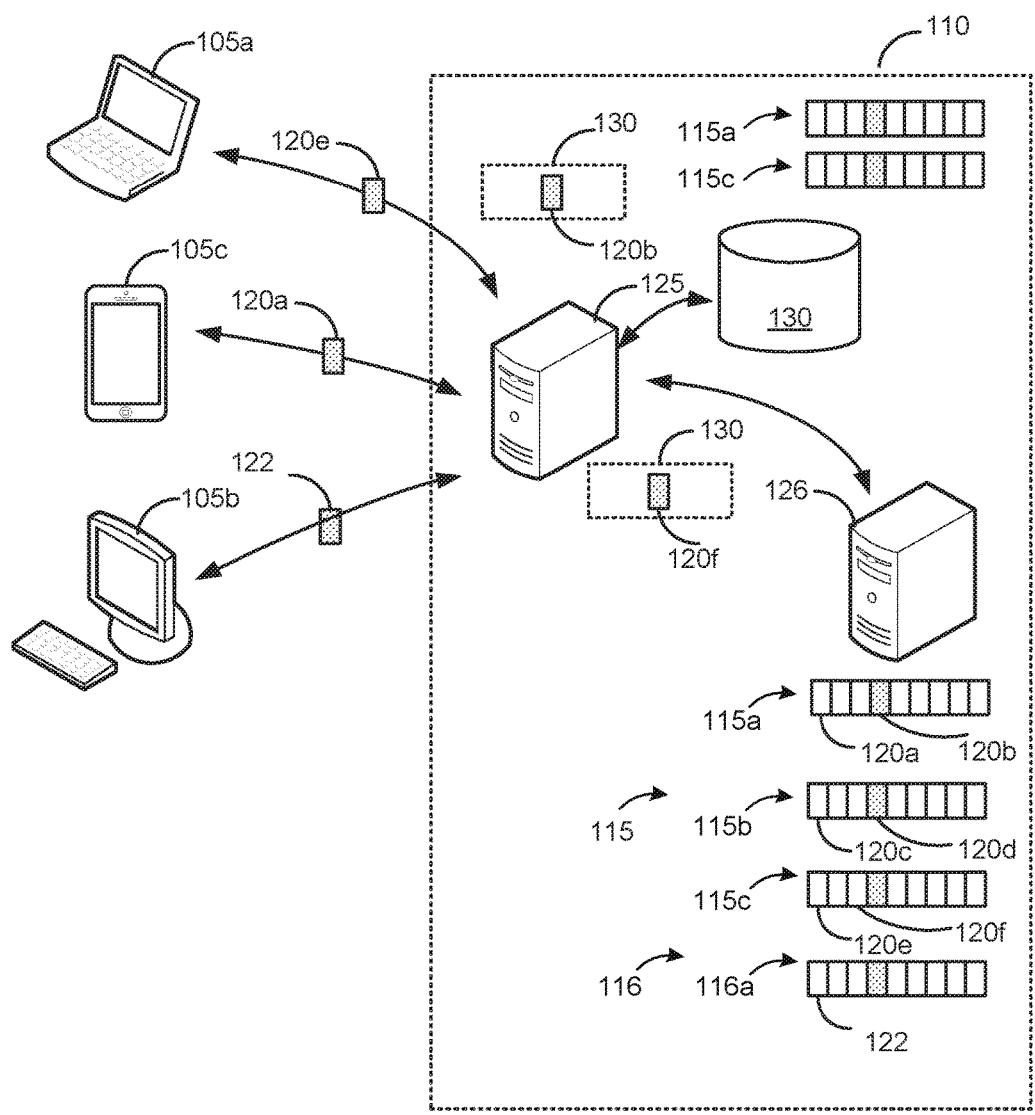
FIG. 1 illustrates an example of the use of a communication channel between a client device and an edge server of a content distribution network (CDN).

FIG. 1 illustrates an example of the use of communication channel between a client device and an edge server of a content distribution network (CDN). As shown in FIG. 1, devices 105a, 105b, and 105c request various media content items from content delivery network (CDN) 110. In this example, devices 105a and 105c each requests a stream of fragments of first media content item 115, while device 105b requests a stream of fragments of second media content item 116. More particularly, device 105a is a laptop requesting various fragments of first media content item 115 with a web browser and device 105c is a smartphone requesting various fragments of first media content item 115 with an application. Device 105b is a smart television requesting second media content item 116. Other devices that request content that may be delivered as described herein may include, for example, mobile devices (e.g., tablets), set top boxes (e.g., for cable and satellite systems), gaming consoles, wearable computing devices (e.g., smart watches), etc.

As an example, first media content item 115 represents a complete media content file for episode #1 of a television series Breaking Bad stored on origin server 126, while second media content item 116 represents a complete media content file for the movie Cinderella stored on origin server 126. In FIG. 1, origin server 126 serves as a central repository for digital storage of a library of media content (including episodes of television shows, movies, music, subtitles, etc.), including first media content item 115 and second media content item 116. First media content item 115 includes multiple files 115a, 115b, 115c corresponding to different versions of the content at 720p at 5 megabits per second (Mbps), 1080p, and 4K UHD video quality levels (or bit rates), respectively. Files 115a, 115b, and 115c each includes multiple fragments. As shown in FIG. 1, file 115a includes fragment 120a and fragment 120b; file 115b includes fragment 120c and fragment 120d; and file 115c includes fragment 120e and fragment 120f. Second media content item 116 includes multiple fragments 122.

Devices 105a, 105b, and 105c implement heuristic algorithms to determine which quality level of fragments to request based on their manifest files. Each manifest file indicates fragments of a media content item for playback at different playback options. The playback options may differ by one or more encoding parameters such as bitrate, resolution, language, subtitles, codec, etc. For example, the playback options for media content item 115 that are available via files 115a, 115b, and 115c may correspond to the 720p at 5 megabits per second (Mbps), 1080p, and 4K UHD video quality levels (or bit rates), respectively.

For example, device 105a might be a laptop running an operating system or software application utilizing a heuristic algorithm that determines which quality level to select fragments at based on the bandwidth of the Internet connection (or other network connection) that device 105a uses to communicate with edge server (or media server) 125 and its available hardware resources, such as the central processing unit (CPU) availability or capacity. As the available bandwidth increases and/or CPU availability increases, the heuristic algorithm can use the information in a manifest file to request higher-quality fragments of the media content. As the available bandwidth decreases and/or CPU availability decreases, then lower-quality fragments of media content (e.g., media content item 115) can be requested. Device 105b might be a smart television implementing the same or a different heuristic algorithm for selecting fragments of media content (e.g., media content item 116) for playback. Similarly, device 105c might be a smartphone implementing the same or a different heuristic algorithm for selecting fragments of media content for playback.

A user can use device 105a to navigate through a web-based catalog of the library of media content from an online media delivery service, and select episode #1 of Breaking Bad to watch. Device 105a requests fragment 120e of file 115c corresponding to 4K UHD video quality level, which may represent a first portion of the episode. Edge server 125 determines whether a copy of fragment 120e of file 115c is in CDN cache 130. Edge server 125 determines that cache 130 contains a copy of fragment 120e, edge server 125 retrieves a copy of fragment 120e from CDN cache 130, and provides a copy of fragment 120e to device 105a for playback.

Similarly, a user can use device 105c to select episode #1 of Breaking Bad to watch via the online media delivery service. Device 105c currently has a low bandwidth, so device 105c requests fragment 120a of file 115a corresponding to 720p at the 5 Mbps quality level, which may represent a first portion of the episode. Edge server 125 determines that a copy of fragment 120a of file 115a is in CDN cache 130. As a result, edge server 125 retrieves a copy of fragment subset 120a from CDN cache 130 and provides the copy of fragment 120a to device 105a for playback.

Another user uses device 105b to select movie Cinderella via the same online media delivery service. More specifically, device 105b requests fragment(s) 122 of file 116a corresponding to media item 116 from edge server 125. Edge server 125 determines that fragment(s) 122 of file 116a are not in CDN cache 130. Edge server 125 obtains a copy of fragment(s) 122 from origin server 126, stores copies of fragment(s) 122 in cache 130, and provides copies of fragment(s) 122 to device 105b for playback. Additional fragments 122 of media content file 116a may also be provided to device 105b such that a "stream" of fragments is provided to device 105b to provide a seamless playback of all or a portion of media content item 116.

Cache 130 allows for copies of recently-requested fragments to be closer to devices 105a, 105b, and 105c, and therefore, provides a closer source for media content than origin server 126. In particular, the next time fragment 122 is requested, a copy of fragment 122 in cache 130 can be provided rather than fetching fragment 122 from origin server 126. For example, if device 105c requests fragment 122, a copy of fragment 122 can be retrieved from cache 130 and can be provided to device 105c.

User of device 105a may be watching content item 115 on device 105a while sitting on a train. More particularly, device 105a may be playing fragment 120e of file 115c corresponding to the 4K UHD quality level. The bandwidth may increase or decrease while the user is travelling and the location of device 105a (and its network connection) changes. In the example depicted in FIG. 1, device 105a can determine that its bandwidth is continuing to degrade, and can provide an indication to edge server 125 that it is likely to request additional fragment(s) of media content item 115 of a file corresponding to a lower quality (or bit rate). For example, device 105a can indicate that it is likely to request fragment 120d of file 115b corresponding to the 1080p quality level. Device 105a can provide this indication as metadata of its request for fragment(s) 120e of first media content item 115. Alternatively, device 105a can provide this indication in a separate message that it transmits to edge server 125. The indication may indicate information such as a time period during which device 105a is likely to request additional fragment(s) of media content item 115 of a file corresponding to a lower quality, particular quality level(s), specific file(s), particular fragment(s) of specific file(s), and/or a likelihood that it will proceed with the request. For example, device 105a may indicate that it is likely to request fragment 120d of file 115b, which may be identified by a corresponding uniform resource locator (and optionally a byte range or time range).

Edge server 125 can determine whether fragment 120d of file 115b is in cache 130. Edge server 125 determines that fragment 120d of file 115b is not contained in cache 130. Edge server 125 can update its caching policy to indicate the increase in the number of devices that are likely to be interested in fragment 120d and/or file 115b (e.g., during a particular period of time). Edge server 125 can apply its caching policy to determine whether to retrieve fragment 120d of file 115b from origin server 126. Edge server 125 can determine that contents of cache 130 are of high priority or in demand by more client devices than fragment 120d of file 115b. Rather than evict contents of cache 130 to make room for fragment 120d of file 115b, edge server 125 can communicate with device 105a regarding contents of cache 130. Instead, edge server 125 can offer fragment 120b of file 115a (corresponding to 720 at 5 Mbps quality level) to device 105a since fragment 120b corresponds to the same segment of playback time of media content item 115 as fragment 120d. In other words, client device 105a can be offered an alternative that is available for streaming to client device 105a.

Client device 105a can decide whether it is willing to accept the alternative that it has been offered, which in this example is of a lower quality than desired or, alternatively, whether it is going to request fragment 120d, which cannot be obtained from cache 130 and therefore is likely to cause interruptions during the streaming of media content item 115. Since device 105a would receive a copy of fragment 120d from origin server 126 rather than edge server 125 (i.e., a server higher up, or farther away, in the hierarchy of CDN 110 from device 105a), the requested fragment may not be provided to device 105a as quickly. Therefore, client device 105a can accept the offer from edge server 125 by requesting fragment 120b from edge server 125, and edge server 125 can retrieve a copy of fragment 120b from cache 130 and provide the copy of fragment 120b to client device 105a for playback.

While user of device 105c is watching content item 115 on device 105c (e.g., fragment 120a of file 115a corresponding to 720p at the 5 Mbps quality level), device 105c can determine that its bandwidth is likely to change and the direction of this change based upon factors such as the quality of the network connection, available hardware resources (e.g., CPU, memory, and/or battery), software resources, location of device 105c, altitude, direction of movement of device 105c, speed or acceleration of device 105c, time of day, day of week, time of year, other applications that are being used, files being downloaded, etc. In this example, device 105c determines that its bandwidth is likely to increase within the next 3 minutes, and can indicate provide an indication to edge server 125 that it is likely to request additional fragment(s) of media content item 115 of a file corresponding to a higher quality (or bit rate). For example, device 105*c* can indicate that it is likely to request fragment 120*d* of file 115*b* corresponding to the 1080p quality level. Device 105*c* can provide this indication as metadata of its request for fragment(s) 120*a* or, alternatively, device 105*c* can provide this indication in a separate message that it transmits to edge server 125. The indication can indicate information such as a time period during which device 105*c* is likely to request additional fragment(s) of media content item 115 of a file corresponding to a higher quality, particular quality level(s), specific file(s), particular fragment(s) of specific file(s), and/or a likelihood that it will proceed with the request. For example, device 105*c* may indicate that it is likely to request fragment 120*d* of file 115*b*.

Edge server 125 determines that fragment 120*d* of file 115*b* is not contained in cache 130. Edge server 125 can update its caching policy to indicate the increase in the number of devices that are likely to be interested in fragment 120*d* and/or file 115*b* during a particular period of time. Edge server 125 can apply its caching policy to determine whether to retrieve fragment 120*d* of file 115*b* from origin server 126. Edge server 125 can determine that contents of cache 130 are of high priority or in demand by more client devices than fragment 120*d* of file 115*b*. Alternatively, edge server 125 can determine that the number of devices that are likely to request fragment 120*d* within the next 3 minutes is sufficiently great that it pre-caches fragment 120*d* by obtaining fragment 120*d* from origin server 126. Thus, while pre-caching can result in eviction of other fragments and negatively impact devices, edge server 125 can use the information it receives from client devices to intelligently make decisions regarding the contents of cache 130.

In this example, rather than evict contents of cache 130 and pre-cache fragment 120*d* of file 115*b*, edge server 125 can communicate with device 105*c* regarding contents of cache 130. For example, edge server 125 can determine that while a copy of file 115*b* is not in cache 130, a copy of file 115*c* is in cache. Thus, edge server 125 can offer a copy of fragment 120*f* of file 115*c* corresponding to the 4K UHD quality level to device 105*c* since fragment 120*f* corresponds to the same segment of playback time of media content item 115 as fragment 120*d*. Since fragment 120*f* corresponds to a greater bit rate than fragment 120*d*, client device 105*c* can choose to accept the offer from edge server 125 by requesting fragment 120*f* from edge server 125, and edge server 125 can provide a copy of fragment 120*f* to client device 105*c* for playback.

Figure 2:
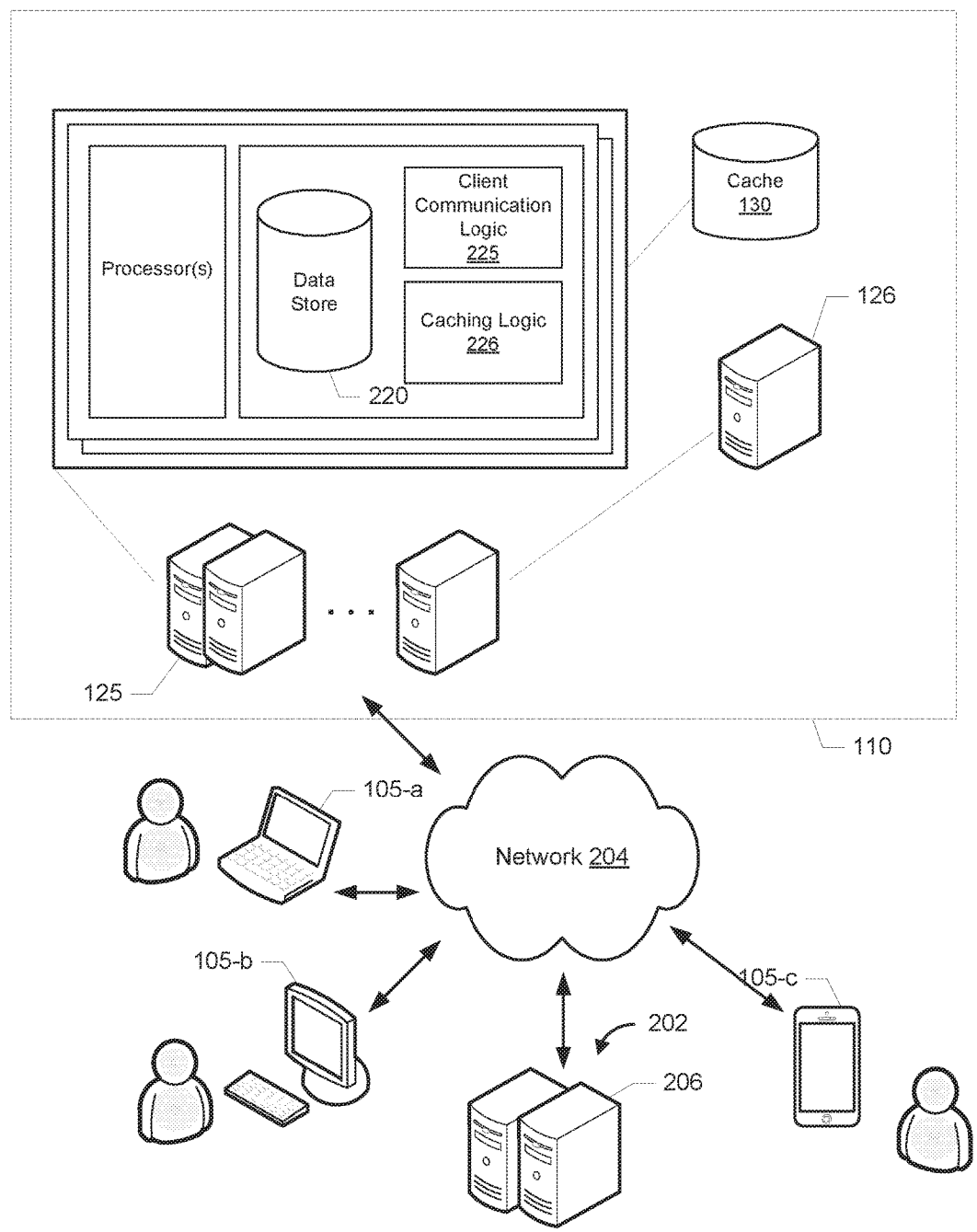
FIG. 2 illustrates an example of a computing environment for a server used to cache media content.

FIG. 2 illustrates an example of a computing environment for a server used to cache media content. As shown in this example, content service (e.g., online media delivery service) 202 provides content via network 204 to a variety of client devices (105-*a* through 105-*c*) associated with users. Content service 202 (which may provide video and/or audio content) may conform to any of a wide variety of architectures such as, for example, a services platform deployed at one or more co-locations, each implemented with one or more servers 206. Network 204 represents any subset or combination of a wide variety of network environments including, for example, TCP/IP-based networks, telecommunications networks, wireless networks, cable networks, satellite networks, public networks, private networks, wide area networks, local area networks, the Internet, the World Wide Web, intranets, extranets, etc. Client devices 105*a-c* may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. Suitable alternatives known to those of skill in the art may be employed.

Content service 202 provides access to content in conjunction with one or more CDNs 110 that are independent of content service 202. CDN 110 can include servers deployed at one or more geographic locations (e.g., across different countries, states, cities, etc.). CDN 110 can include a distributed system of servers including edge server(s) 125 and origin server(s) 126 deployed in multiple data centers across a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

CDN 110 may include a hierarchy of servers including edge server 125, origin server 126, and a variety of servers in between edge server 125 and origin server 126. For example, a "middle tier" between edge server 125 and origin server 126 can provide an intermediate level of caching and other functionality. Though the implementations described herein can provide fragments of media content items at edge server 125, in other implementations, the functionality may be provided elsewhere within CDN 110. For example, the functionality may be provided by origin server 126 and/or in between origin server 126 and edge server 125. Moreover, multiple layers of caching may be provided. For example, the functionality may be in both edge server 125 and origin server 126. It should be noted that, while edge server 125 and origin server 126 are contemplated as part of a CDN, implementations are contemplated in which origin server 126 operates remotely from the CDN, and/or origin server 126 is under the control of an independent entity.

Edge server 125 can include one or more processors, memory, and other hardware for performing various tasks disclosed herein. In addition, data store 220 can store data such as cache keys, manifests for media content, and/or other types of data used by client communication logic 225 and caching logic 226 to allow edge server to cache media content fragments and communicate to client devices as described herein. While cache 130 can be implemented, at least in part, at edge server 125, cache 130 can also be implemented external to edge server 125, as shown in FIG. 2.

Edge server 125 can include various types of logic used to provide media content for playback. Edge server 125 can also be configured to communicate, directly or indirectly, with other edge servers regarding server availability and/or quality of service. Edge server 125 can also receive additional information from content service 202 and/or other edge servers regarding other client devices and/or requests for media content. For example, the additional information can indicate the popularity of various media content items and/or the frequency of requests for various media content items during various times of the day, week, or year.

In addition, edge server 125 includes client communication logic 225. Client communication logic 225 can parse a message received from a client device during media content playback. In addition, communication logic 225 can identify situations in which it is desirable to send a communication to the client device regarding the services and/or content it anticipates edge server 125 or CDN 110 will be capable of providing to the client device. Such a communication can be transmitted independently or in response to the indication of media fragments the client device has predicted requesting. Therefore, communication logic 225 can identify situations in which it is appropriate to send a communication to the client device regarding its previously communicated prediction(s) and transmit the communication to the client.

Communication logic 225 can consider information received from various sources in its decision to transmit a communication to a client device and/or the metadata it transmits in a communication to a client device. More particularly, communication logic 225 can consider statistics received from CDN 110, other edge servers, and/or content service 202, as well as media content requests and other messages received from client devices. Statistics can include those regarding quality of service received by client devices in association with factors including, but not limited to, server identity, server location, device identity, device location, time of day, day of week, time of year, title of media content, and/or identity of specific media content files. In addition, communication logic 225 can consider statistics regarding the popularity of various media content titles and/or files in association with factors such as time of day, day of week, time of year, geographic location, etc.

For example, upon receiving a communication from the client device regarding fragment(s) the client device anticipates requesting from edge server 125, edge server 125 can determine that the fragment(s) are not in cache 130. Edge server 125 can determine whether other fragments for the same segment(s) of the same media content as those the client anticipates requesting are in cache 130 (e.g., using the media content title and/or cache key). Communication logic 225 can then determine whether to offer the client device an alternative (e.g., file or fragment(s)) to the fragment(s) that the client has predicted requesting for the same segment(s) of the same media content. Where another file or fragment(s) corresponding to the same segment(s) of the same media content in which the client has shown interest is in cache 130, communication logic 225 can send a communication that offers the file or fragment(s) in cache 130 as an alternative to the client device. Communication logic 225 can implement various heuristics to determine whether a file or fragment in cache 130 is a suitable alternative, or to select the optimal of several possible alternatives.

A communication can be provided by edge server 125 as metadata of a fragment(s) being provided to the client device or, alternatively, can be provided in a separate message generated by edge server 125. For example, the communication can indicate a playback option (e.g., quality level) that is available or likely to be available to the client device, specific file(s) or fragment(s) that are available, a time period during which a fragment or file is likely to be available, a likelihood that the fragment or file will be available, and/or a quality of service that is likely to be available from edge server 125, CDN 110, or a group of edge servers (e.g., in a particular data center). For example, the quality of service may pertain to the availability of a group of edge servers, availability of edge server 125 and/or capacity (e.g. CPU, memory, and/or battery) of edge server 125. In one implementation, the communication indicates an availability score and/or capacity score of edge server 125, a group of servers in a data center, and/or CDN 110.

Edge server 125 can also include caching logic 226, which can include caching policies that govern caching decisions made by edge server 125, as well as mechanisms used to update the caching policies. Thus, the content stored in cache 130 may be based on caching logic 226 implemented by edge server 125. For example, caching logic 226 of edge server 125 may store the most recently requested fragments of media content in cache 130. In addition, caching logic 226 of edge server 125 may pre-cache various fragments of media content in anticipation that those fragments will be requested in the near future by devices that have communicated regarding their predictions to edge server 125, choose to evict other fragments from cache 130, or retain various fragments in cache 130 that it might otherwise have evicted. Caching logic 226 may also update the caching policies implemented by caching logic 226 as communications are received from client devices. For example, caching logic 226 may update the caching policies that govern eviction, retention, and/or pre-caching of fragments based, at least in part, upon the number of client devices that have indicated that they are likely to be interested in a particular file or fragment, time periods during which the client devices are likely to request the particular file or fragment, an indication of likelihood that has been communicated by the client devices that they will subsequently request the particular file or fragment, and/or whether the devices follow through with requesting the particular file or fragment. In some implementations, caching logic 226 may update caching policies based, at least in part, on information received from entities other than client devices, such as CDN 110, other edge servers, or content service 202.

In one implementation, edge server 125 may maintain a count associated with each one of a plurality of fragments. Each count indicates the desirability of having a copy of the corresponding fragment in cache 130. More particularly, fragments having higher counts are those that are most likely to be requested by client devices, while those fragments having lower counts are those that are least likely to be requested by client devices. In other implementations, fragments that are most likely to be requested by client devices are those having lower counts, while fragments having higher counts are those that are least likely to be requested by client devices.

For example, when a fragment is requested, edge server 125 may increment the count associated with that fragment; when a device indicates that it is likely to request a fragment but does not request the fragment, edge server 125 may increment the count associated with that fragment by 0.5. Edge server 125 can also modify the count based upon other factors such as the likelihood (e.g., client indicated or historical) that the client will subsequently request the fragment. The count may also be reduced if the fragment is not accessed within a period of time or it has not been requested as anticipated. In addition, counts may also be reduced over time according to a decay function.

Edge server 125 can prioritize fragments based, at least in part, on their associated counts. Based upon this priority, edge server 125 can ensure that copies of the highest prioritized fragments are in cache 130 by either pre-caching those fragments or maintaining copies of those fragments in cache 130 (e.g., by choosing not to evict those copies from cache 130.

Figure 3:
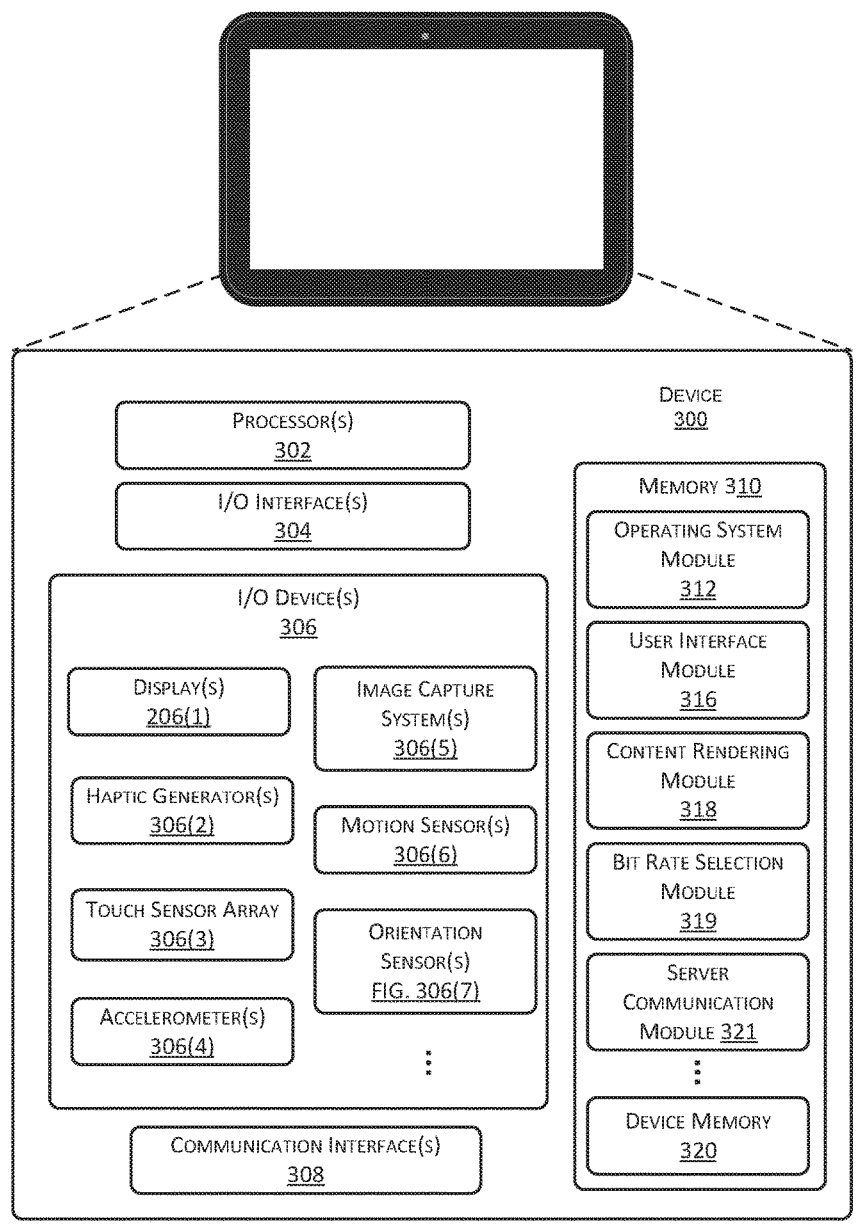
FIG. 3 is a block diagram illustrating an electronic device that may be employed with various implementations.

FIG. 3 is a simplified block diagram illustrating an electronic device that may be employed with various implementations. Device 300 includes one or more single or multi-core processors 302 configured to execute stored instructions (e.g., in device memory 310). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 404 is coupled to one or more I/O devices 306. The I/O device(s) 306 may include one or more displays 306(1), one or more haptic generators 06(2), a touch sensor array 306(3), one or more accelerometers 306(4), one or more image capture systems 306(5), one or more motion sensors 306(6), one or more orientation sensors 306(7), microphones, speakers, and so forth. The one or more displays 306(1) are configured to provide visual output to the user and may comprise any of a variety of display types including, for example, any type of reflective or transmissive display. Touch sensor array 306(3) may be a capacitive sensor array having a matrix of conductors that are scanned to determine, for example, the location, duration, speed and direction of touch events within the matrix based on changes in electrical capacitance.

Implementations enabled by the present disclosure contemplate logic resident on the client devices consuming content from content service 202; such logic being configured to communicate with edge servers regarding files or segments thereof that they are likely to request. Files or segments may be explicitly identified in these communications or implied, as described in further detail below. The logic might be implemented, for example, in a media player on the client device or as a separate application resident on the client device.

Device 300 may also include one or more communication interfaces 308 configured to provide communications between the device and other devices, including edge servers. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. Memory 310 includes at least one operating system (OS) module 312 configured to manage hardware resources such as I/O interfaces 404 and provide various services to applications or modules executing on processor(s) 302. Memory 310 also includes a user interface module 316, a content rendering module 318, bit rate selection module 319, server communication module 321, and other modules.

Bit rate selection module 319 may be configured to request fragments of different quality levels as the bandwidth of device 300 and/or available resources changes. For example, resources can include hardware resources of device 300 such as CPU and/or memory. In addition, bit rate selection module 319 may anticipate when device 300 is likely to request fragments of either a higher or lower quality level. Information that may be considered by device 300 when determining the likelihood that it will request fragments of either a higher or lower quality level can include factors such as a current bandwidth of device 300, whether the bandwidth is increasing or decreasing, the rate at which the bandwidth is increasing or decreasing, location of device 300, altitude of device 300, speed of device 300, acceleration of device 300, time of day, day of week, time of year, other applications running on device 300, type of network connection, available hardware resources (e.g., CPU, memory, and/or battery), and/or any other indicators of whether available hardware or other resources are increasing or decreasing. Bit rate selection module 319 may also determine an approximate time or time period during which it will likely request fragment(s) of a higher or lower quality level and/or a likelihood that it will request the fragment(s).

Server communication module 321 may be configured to generate and transmit a request to a media server (e.g., edge server) for media content. In addition, server communication module 321 may be configured to transmit communications indicating files or fragments that it anticipates it may request from CDN 110 or edge server 125. Such communications may be transmitted to edge server 125 as metadata of media content requests or as messages that are distinct from requests for media content. The communications may include one or more of the following: an identifier or a location (e.g., URL) of specific file(s) or fragment(s) that device 300 is likely to request, an indication of a time period during which device 300 is likely to transmit a request for file(s)/fragment(s), an indication of whether device 300 anticipates requesting fragment(s) in a higher or lower bit rate, an indication of a current bandwidth, an indication of a capacity or available resources (e.g., CPU, memory, and/or battery) of device 300, an indication of whether the current bandwidth (or other resources) is increasing or decreasing, a speed with which the current bandwidth or other available resources is changing, an indication of a range of bit rates corresponding to files/fragments device 300 anticipates requesting, an indication of a likelihood that device 300 will subsequently transmit request(s) for the anticipated file(s) or fragment(s), and/or an amount of content (e.g., period of playback time in seconds or minutes) in a buffer of device 300.

Server communication module 321 may also be configured to parse communications received from edge server 125 or another server. For example, server communication module 321 may be configured to parse a communication from edge server 125 that offers device 300 a file or fragment(s) corresponding to a bit rate other than device 300 previously anticipated requesting.

Bit rate selection module 319 may be configured to consider information received from edge server 125 (e.g., via server communication module 321) in its bit rate selection process. For example, bit rate selection module 319 may determine whether to accept an offer from edge server 125 for an alternative file or fragment(s). Various heuristics may be implemented to determine whether an alternative file or fragment(s) is a reasonable alternative for the segment(s) of the media content in which device 300 is interested. For example, where the alternative corresponds to the same bit rate as the one in which device 300 has shown interest but does not include subtitles, device 300 may determine that the alternative is a reasonable one and request the offered alternative from edge server 125.

Memory 310 also includes device memory 320 to store a wide variety of instructions and information using any of a variety of formats including, for example, flat files, databases, linked lists, trees, or other data structures. Such information includes content for rendering and displaying on display 306(1) including, for example, any type of video content. In some implementations, a portion of device memory 320 may be distributed across one or more other devices including servers, network attached storage devices, and so forth.

Figure 4:
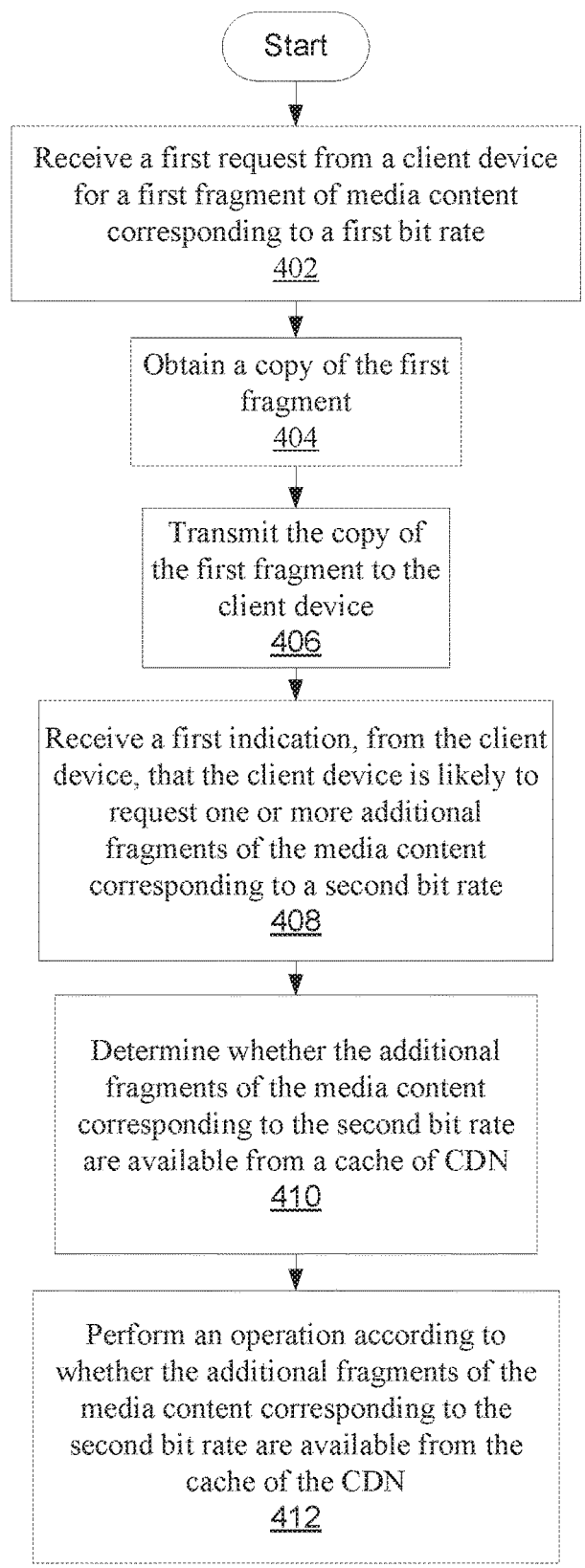
FIG. 4 is a flowchart illustrating a method of implementing a communication channel between an edge server of a CDN and a client device.

The logic or computer program instructions used to support the communication channel between device 300 and server(s) such as edge server 125 (represented by bit rate selection module 319 and server communication module 321) may be implemented in a variety of ways. For example, at least some of this functionality may be implemented as part of the code of a media player operating on device 300. And as mentioned above, implementations are contemplated in which at least a portion of the logic or computer program instructions may reside on a separate platform, e.g., CDN edge server 125, etc. Suitable variations and alternatives will be apparent to those of skill in the art. It will also be understood that device 300 of FIG. 3 is merely an example of a device with which various implementations of the present invention may be practiced, and that a wide variety of other devices types may also be used (e.g., devices 105-*a* to 105-*c*). The scope of the invention should therefore not be limited by reference to device-specific details A specific implementation will now be described with reference to the communication channel of FIG. 1, the computing environment of FIG. 2, and the flow diagrams of FIG. 4-FIG. 7. FIG. 4 is a flowchart illustrating a method of implementing a communication channel between an edge server of a CDN and a client device. In the depicted implementation, a user selects media content for playback on a device, for example, by selecting a video for playback from a video streaming service. In some implementations, when the user selects a particular video to play, the device will use a manifest file including metadata that allows the device to generate properly formatted requests for specific fragments of media content. The manifest file can indicate fragments of the media content for playback at different playback options. The playback options may differ by one or more encoding parameters such as bitrate, resolution, language, codec, etc. For example, the playback options may correspond to the 4K UHD, 1080p, and 720p at 5 megabits per second (Mbps) video quality levels (or bit rates).

The manifest may be requested by the device and provided by any component of CDN 110 (e.g., edge server 125 or origin server 126). In other implementations, the manifest may already be on the device, may be retrieved from another source such as a webpage, etc. In any case, the device uses a manifest that can be used to generate requests (e.g., form the appropriate URLs specifying the particular starting time of the associated time range) for fragments of media content.

Manifests may be provided in a variety of formats. In some implementations, manifests are an Extensible Markup Language (XML) formatted document. Edge server 125 receives a request from a client device for a first fragment of the media content, where the first fragment corresponds to a first playback option that corresponds to a first bit rate (402). For example, the first bit rate may be the 1080p bit rate.

Edge server 125 then obtains a copy of the first fragment (404). More particularly, edge server 125 determines if a copy of the first fragment is already within cache 130. If a copy of the first fragment is already in cache 130, then the copy of the first fragment is retrieved from cache 130 and provided to the client device for playback. However, if a copy of the first fragment is not in cache 130, then origin server 126 is contacted to retrieve a copy of the first fragment and provide it to edge server 125. When edge server 125 receives the first fragment from origin server 126, it may be stored in cache 130 and provided to the client device for playback (406).

Next, edge server 125 receives a first indication, from the client device, that the client device is likely to request additional fragment(s) of the media content (408). More particularly, the first indication may indicate that the additional fragment(s) the client is likely to request correspond to the first playback option. Alternatively, the first indication may indicate that the additional fragments the client is likely to request correspond to a second playback option, which may correspond to a second bit rate. For example, the second bit rate may be the 4K UHD bit rate. Edge server 125 may also receive, from the client device, additional information such as an indication of a time period during which the client device is likely to request the additional fragments of the media content (e.g., corresponding to the second playback option) and/or an indication of a likelihood that the client device will request the additional fragments of the media content.

In some instances, the client device may indicate that it is likely to request additional fragments of the media content that correspond to a different playback option (or bit rate). For example, where the client determines that its bandwidth is increasing, edge server 125 may receive an indication from the client device that it is likely to request fragments of the media content that correspond to a higher bit rate. Similarly, where the client determines that its bandwidth is decreasing, edge server 125 may receive an indication from the client device that it is likely to request fragments of the media content that correspond to a lower bit rate.

In other instances, the client device may predict that it is likely to request additional fragments of the media content that correspond to the same playback option (or bit rate). For example, edge server 125 may receive an indication from the client device that it is likely to request fragments of the media content of one or more subsequent chapters within the media content.

Edge server 125 may obtain the indication(s) from metadata of the first request or from a message that is independent from the first request. Edge server 125 determines whether a copy of the additional fragment(s) of the media content (e.g., corresponding to the second playback option) is available from cache 130 (410). Edge server 125 then performs an operation according to a result of determining whether a copy of the additional fragments of the media content is available from cache 130 (412). More particularly, if a copy of the additional fragment(s) of the media content that the client predicted it is likely to request is already in cache 130, edge server 125 retrieves the stored fragment from cache 130 and provides the fragment to the device. However, if a copy of the additional fragment(s) of the media content is not cache 130, edge server 125 can perform various operations including, but not limited to, pre-caching a copy of the additional fragment(s) of the media content, updating a caching policy of the CDN (e.g., by updating a machine learning model or incrementing a count associated with the additional fragment(s)), and/or transmitting a second indication to the client device. The second indication can be transmitted as metadata of a message including a copy of the first fragment or in a message that is independent from a copy of the first fragment. For example, the second indication may indicate alternative fragment(s) of the media content that are or will be available to the client device from the CDN (e.g., in the near future or within the time period indicated by the client device), a likelihood of whether the additional fragments of the media content will be available from the CDN, and/or a quality of service the client device is likely to receive from the CDN or edge server 125. For example, wherein the client indicates that it is likely to request additional fragment(s) corresponding to a second playback option (or bit rate), the alternative fragment(s) may correspond to a third playback option (or bit rate).

Based upon the indication received from edge server 125, the client device can decide how to next proceed. For example, the client device may ascertain that the third playback option corresponds to the same bit rate as the second playback option, but also includes subtitles. Since the fragment offered by edge server 125 is readily available in cache 130, client device may proceed to request a fragment of the media content corresponding to the third playback option, as offered by edge server 125.

Edge server 125 can update its caching policies based upon further actions of the client device. For example, if the client device proceeds to request the additional fragment(s) of the media content, edge server 125 can update its caching policy to reflect the accuracy of the predictions of or indications provided by the client device. As another example, if the client device accepts an offer previously made by edge server 125 to provide alternative fragments of the media content (e.g., corresponding to an alternative playback option) and the client device subsequently requests the alternative fragment(s), edge server 125 can update its caching policies accordingly.

Figure 5:
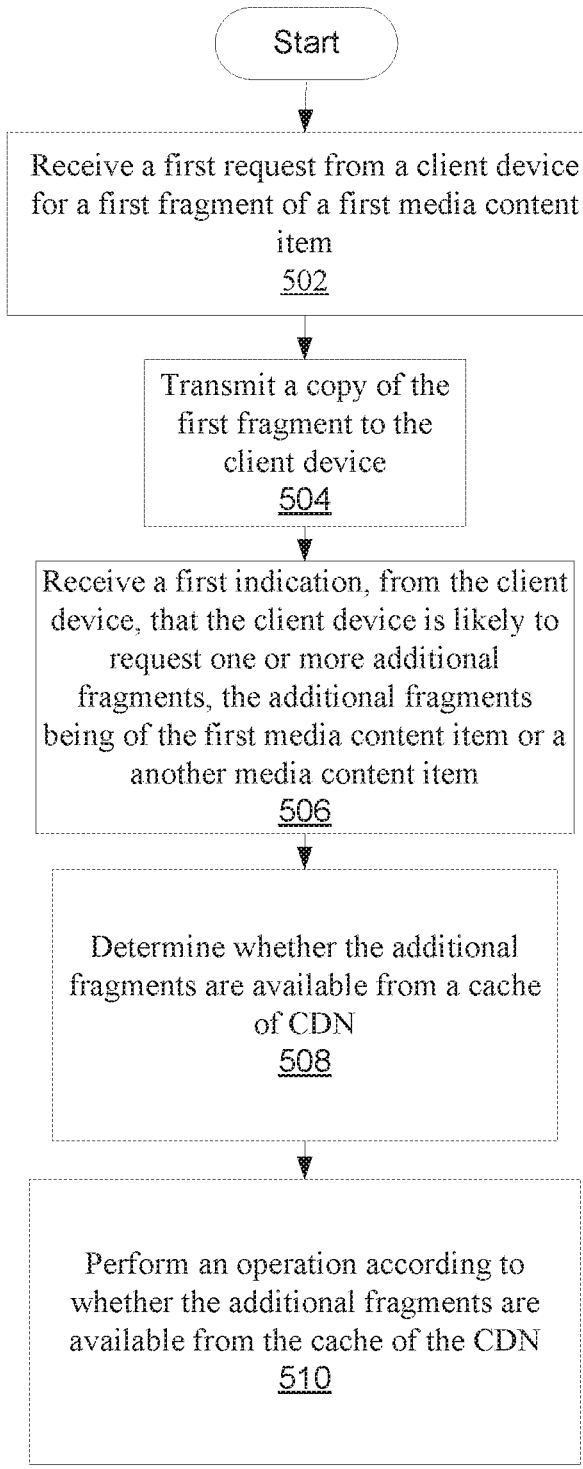
FIG. 5 is a flowchart illustrating another method of implementing a communication channel between an edge server of a CDN and a client device.

As described above, the client device can predict that it is likely to request additional fragments of a media content item during playback of the media content item. In other instances, the client device may predict that it is likely to request fragments of a different media content item. As shown in FIG. 5, edge server 125 receives a first request from a client device for a first fragment of a first media content item (502). Edge server 125 transmits a copy of the first fragment to the client device (504).

Edge server 125 receives a first indication, from the client device, that the client device is likely to request one or more additional fragments, the additional fragments being of the first media content item or a second media content item that is different from the first media content item (506). For example, as playback of the first episode of the television series Breaking Bad nears completion, the client device may predict that it is likely to request fragments of the second episode of the television series. The indication may be received from the client device, for example, as the credits are rolling during playback of the first episode. Edge server 125 determines whether the additional fragments are available from a cache of a CDN (508). Edge server 125 performs an operation based, at least in part, on whether the additional fragments are available from the cache of the CDN (510), as described above.

Figure 6:
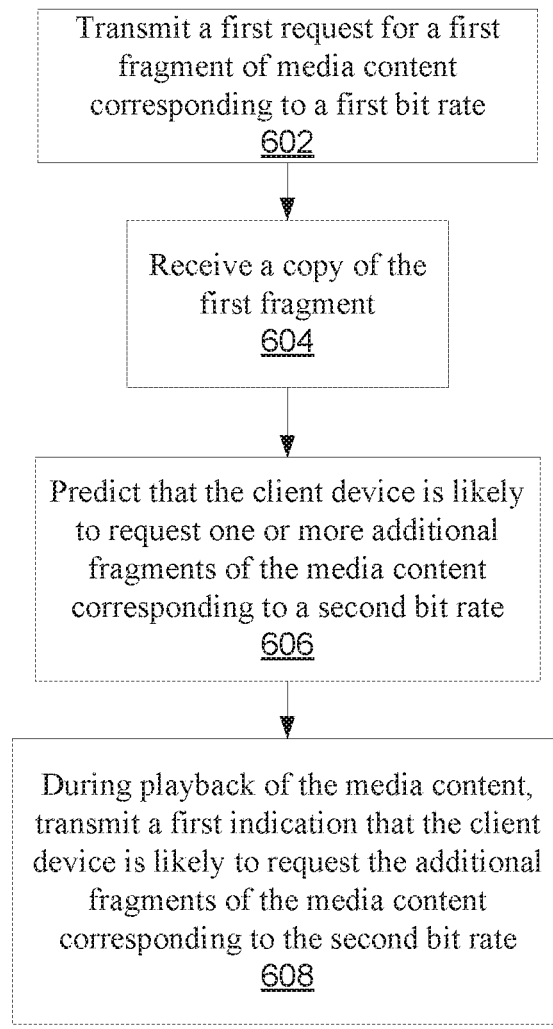
FIG. 6 is a flowchart illustrating a method of operating a client device.

FIG. 6 is a flowchart illustrating a method of operating a client device. A client device sends a first request relating to playback of media content to edge server 125 of CDN 110, where the first request indicates a first fragment of the media content (602). The first fragment corresponds to a first playback option or bit rate. The client device receives a copy of the first fragment (604). The client device may make predictions regarding fragments of the media content that the client device is likely to request from CDN 110 (606). For example, the client device may predict that it is likely to request additional fragment(s) of the media content corresponding to a second playback option or bit rate. As discussed above, the client device may predict a bit rate (or quality) corresponding to fragments that it is likely to request based, at least in part, on information such as its current bandwidth, whether the bandwidth is increasing or decreasing, the rate at which the bandwidth is increasing or decreasing, the location of the device, the altitude of the device, the speed of the device, the rate of acceleration of the device, the time of day, the day of the week, the time of year, other applications running on the device, the type of network connection, available hardware resources (e.g., CPU, memory, and/or battery), whether the available hardware resources are increasing or decreasing, and/or the rate at which the hardware resources are increasing or decreasing.

During playback of the media content, the client device may communicate with edge server 125 by transmitting a first indication that the device is likely to request one or more additional fragments of the media content (608). For example, the client may indicate that it is likely to request additional fragments of the media content corresponding to a second bit rate. The first indication can indicate information such as the specific fragments the client device is likely to request, a time period during which the device is likely to request the additional fragments of the media content (e.g., corresponding to the second bit rate), and/or a likelihood that the device will request the additional fragments of the media content. The first indication can be transmitted as metadata of the first request or as a separate message during playback of the media content.

The client device may receive a second indication from edge server 125 that indicates whether the additional fragments of the media content are available (610). For example, the second indication can indicate one or more alternative fragments of the media content that are available (e.g., via a URL), a likelihood of whether the additional fragments of the media content (e.g., corresponding to the second bit rate) will be available, a time period during which the additional fragments of the media content will be available, and/or a quality of service the computing device is likely to receive.

The client device may generate a second request pertaining to playback of the media content based, at least in part, on the second indication. For example, where edge server 125 indicates that fragment(s) of the media content corresponding to the second bit rate are available or are likely to be available, the client device can request fragment(s) corresponding to the second bit rate. Alternatively, where edge server 125 indicates an alternative fragment that is available, will be available, or is likely available (e.g., by identifying a corresponding URL), the client device can choose to request the alternative fragment. The client may then transmit the second request to edge server 125.

Figure 7:
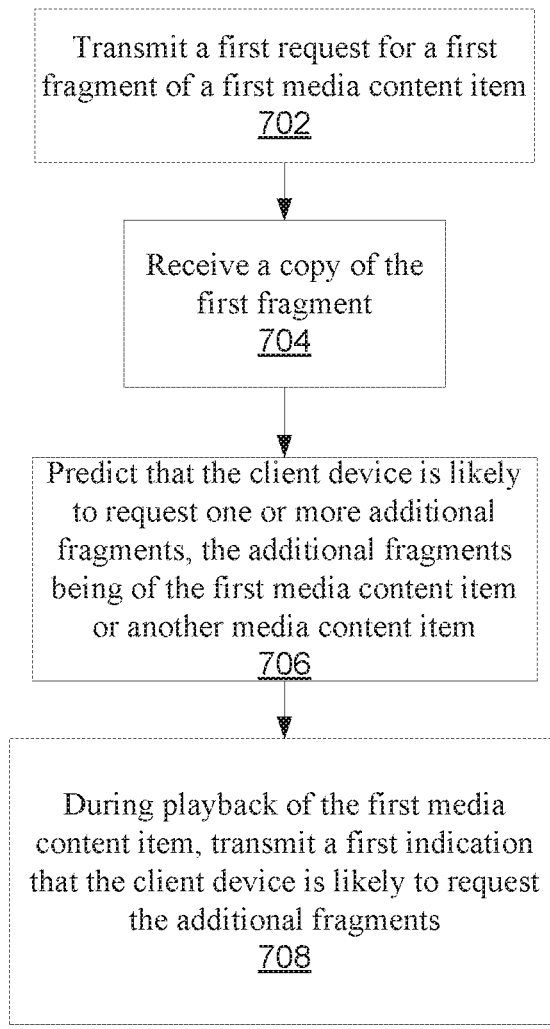
FIG. 7 is a flowchart illustrating another method of operating a client device.

FIG. 7 is a flowchart illustrating another method of operating a client device. A client device may transmit a request for a first fragment of a first media content item (702). The client device may receive a copy of the first fragment (704). During playback of the first media content item, the client device predicts that it is likely to request one or more additional fragments, where the additional fragments are fragments of the first media content item or a second media content item that is different from the first media content item (706).

In some instances, the client device may predict that it will request additional fragments of the first media content item. For example, where the bandwidth of the client device is changing, the client device may predict that it will request additional fragments of the first media content item that correspond to a different bit rate. As another example, where the client device recognizes specific viewing patterns (e.g., watching the middle portion of episodes first) or receives information pertaining to viewing patterns associated with other client devices, the client device may predict that it will request various fragments of the first media content item, which may correspond to the current bit rate. As yet another example, the client device may make predictions based upon specific rules that are configured at the client device (e.g., pre-fetch the beginning of the next chapter when playback begins). In this manner, the client device may predict the fragments that have a high likelihood of being requested (e.g., selected by a user).

In other instances, the client device may predict that it will request additional fragments of a second media item that is different from the first media item. This may occur, for example, when the user is sequentially viewing multiple episodes of the same television series. Thus, the client device may predict that the user will watch the next episode after completion of the prior episode of the same series.

The client device transmits a first indication that is likely to request the additional fragments to edge server 125 (708). For example, the first indication may indicate that the client device is likely to request fragments of the first media content item in a different bit rate than currently being received from edge server 125. As another example, the first indication may indicate that the client device is likely to request various additional fragments of the first media content item (e.g., at starting points of one or more subsequent chapters of the first media content item). As yet another example, the client device may ascertain that playback of an episode of a television series is nearing completion, and send an indication that it is likely to request fragments of the next episode of the series (e.g., a second media content item). The client device may subsequently operate based, at least in part, on any communications it may receive from edge server 125.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computing device, comprising:
one or more processors and memory configured to:
transmit, by a client device to a content distribution network (CDN), a first request relating to playback of media content, the first request indicating a first fragment of a first media content item;
initiate playback, by a media player of the client device, of a copy of the first fragment received from the CDN;
predict, by the client device during playback of the copy of the first fragment, that the client device is likely to request one or more additional fragments of the first media content item or a second media content item;
generate, by the client device, a first indication that the client device is likely to request the additional fragments, the first indication indicating at least one of: 1) a time period during which the client device is likely to request the additional fragments; or 2) a likelihood that the client device will request the additional fragments, wherein the first indication is not a request for the additional fragments; and
transmit, by the client device, the first indication to the CDN.

2. The computing device as recited in claim 1, the one or more processors and memory being further configured to:
receive a second indication indicating whether the additional fragments are available;
generate a second request pertaining to playback of the first media content item or the second media content item based, at least in part, on the second indication; and
transmit the second request.

3. The computing device as recited in claim 2, wherein the second request indicates a second fragment of the first media content item, the first fragment encoded in a first bit rate and the second fragment encoded in a second bit rate that is different from the first bit rate.

4. The computing device as recited in claim 2, wherein the second indication comprises an indication of a second fragment that is available to the client device, the second fragment being of the first media content item or of the second media content item;
wherein the second request indicates the second fragment of the media content.

5. The computing device as recited in claim 2, wherein the second indication comprises an indication of at least one of:
a likelihood of whether the additional fragments will be available;
a time period during which the additional fragments will be available from the CDN; or
a quality of service the client device is likely to receive.

6. The computing device as recited in claim 1, wherein the first indication indicates that the additional fragments are of the first media content item.

7. The computing device as recited in claim 1, wherein the first fragment is encoded in a first bit rate, and wherein the additional fragments are encoded in a second bit rate.

8. The computing device as recited in claim 1, wherein the additional fragments are of the second media content item.

9. The computing device as recited in claim 1, the one or more processors and memory being further configured to:
generate a message including the first indication; and transmit the message including the first indication;
wherein the message is independent from the first request;
wherein the message is not a request for the additional fragments.

10. The computing device as recited in claim 1, the one or more processors and memory being further configured to:
include the first indication as metadata of the first request.

11. The computing device as recited in claim 1, the processors and memory being further configured to:
transmit, by the client device to the CDN, a second request relating to playback of the additional fragments; and
initiate playback, by the media player of the client device, of a copy of the additional fragments received from the CDN.

12. A computing device, comprising:
one or more processors and memory configured to:
process a first request received from a client device, the first request relating to playback of a first media content item and indicating a first fragment of the first media content item;
transmit a copy of the first fragment to the client device;
process a first indication received from the client device during playback of the copy of the first fragment, the first indication indicating that the client device is likely to request one or more additional fragments of the first media content item or of a second media content item, the first indication indicating at least one of: 1) a time period during which the client device is likely to request the additional fragments or 2) a likelihood that the client device will request the additional fragments, wherein the first indication is not a request for the additional fragments;
determine whether the additional fragments are available from a cache of a content distribution network (CDN); and
perform an operation based, at least in part, on whether the additional fragments are available from the cache of the CDN.

13. The computing device as recited in claim 12, wherein the additional fragments are of the first media content item.

14. The computing device as recited in claim 13, wherein the first fragment corresponds to a first playback option; and
wherein the first indication indicates that the additional fragments correspond to a second playback option, the second playback option being different from the first playback option.

15. The computing device as recited in claim 12, wherein the additional fragments are of the second media content item.

16. The computing device as recited in claim 12, the one or more processors and memory being further configured to:
obtain the first indication from metadata of the first request or from a message that is independent from the first request, wherein the message is not a request for the additional fragments.

17. The computing device as recited in claim 12, wherein performing an operation comprises transmitting, by the edge server, a second indication to the client device pertaining to the first indication;
wherein the second indication is transmitted a) in a message that is independent from the copy of the first fragment; or b) as metadata included in a message including the copy of the first fragment.

18. The computing device as recited in claim 12, wherein performing an operation comprises transmitting a message to the client device, the message indicating at least one of:
one or more alternative fragments that are available;
a likelihood of whether the additional fragments will be available;
a time period during which the additional fragments will be available from the CDN; or
a quality of service the client device is likely to receive.

19. The computing device as recited in claim 12, the one or more processors and memory being further configured to perform the operation by:
updating a caching policy of the CDN based, at least in part, on the indication that the client device is likely to request the additional fragments.

20. The computing device as recited in claim 12, the one or more processors and memory being further configured to perform the operation by:
modifying contents of the cache of the CDN based, at least in part, on the indication that the client device is likely to request the additional fragments.

21. The computing device as recited in claim 12, the first fragment encoded in a first bit rate and the additional fragments encoded in a second bit rate.

22. A computer implemented method, comprising:
receiving, by an edge server of a content distribution network (CDN), a first request from a client device relating to playback of media content, the first request indicating a first fragment of the media content, the first fragment encoded in a first bit rate;
obtaining, by the edge server, a copy of the first fragment;
transmitting, by the edge server, the copy of the first fragment to the client device;
during playback of the copy of the first fragment of the media content, receiving by the edge server of the CDN from the client device, a first indication that the client device is likely to request one or more additional fragments of the media content encoded in a second bit rate, the second bit rate being different from the first bit rate;
obtaining, by the edge server, the first indication from metadata of the first request or from a message that is independent from the first request, wherein the message is not a request for the additional fragments;
determining, by the edge server, whether the additional fragments of the media content encoded in the second bit rate are available from a cache of the CDN; and
pre-caching, by the edge server, the additional fragments based, at least in part, on whether the additional fragments of the media content encoded in the second bit rate are available from the cache of the CDN, wherein pre-caching includes storing the additional fragments in the cache of the CDN.

23. The method as recited in claim 22, further comprising:
transmitting, by the edge server, a second indication to the client device in response to the first indication;
wherein the second indication is transmitted a) in a message that is independent from the copy of the first fragment; or b) as metadata included in a message including the copy of the first fragment.

24. The method as recited in claim 22, wherein the first indication further comprises an indication of at least one of: a) a time period during which the client device is likely to request additional fragments of the media content corresponding to the second bit rate; or 2) a likelihood that the client device is likely to request additional fragments of the media content corresponding to the second bit rate.

25. The method as recited in claim 22, further comprising transmitting, by the edge server of the CDN to the client device, a message to the client device, the message indicating at least one of:
- one or more alternative fragments of the media content that are available to the client device;
- a likelihood of whether fragments of the media content corresponding to the second bit rate will be available to the client device;
- a time period during which the fragments of the media content corresponding to the second bit rate will be available to the client device from the CDN; or
- a quality of service the client device is likely to receive.

26. The method as recited in claim 22, wherein the first indication identifies the additional fragments.

27. The method as recited in claim 22, further comprising:
- after performing the operation, receiving, by the edge server of the CDN, a second request from the client device relating to playback of the additional fragments of the media content;
- retrieving, by the edge server of the CDN, the additional fragments of the media content from the cache of the CDN; and
- transmitting, by the edge server of the CDN, a copy of the additional fragments of the media content to the client device.

28. The method as recited in claim 22, wherein the message is distinct from requests for fragments of the media content.

* * * * *